(12) United States Patent
Li et al.

(10) Patent No.: US 10,448,220 B2
(45) Date of Patent: *Oct. 15, 2019

(54) SMALL CELL AND SMALL-CELL SUBSCRIBER MANAGEMENT METHOD (71) Applicant: Huawei Technologies Co., Ltd., Shenzhen (CN)

(72) Inventors: Yingtao Li, Shenzhen (CN); Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,839

(22) Filed: Nov. 27, 2017

(65) Prior Publication Data

US 2018/0084391 A1 Mar. 22, 2018

Related U.S. Application Data

(63) Continuation of application No. PCT/CN2015/088185, filed on Aug. 26, 2015.

(51) Int. Cl.
*H04W 4/08* (2009.01)
*H04W 48/14* (2009.01)
(Continued)

(52) U.S. Cl.
CPC ............ *H04W 4/08* (2013.01); *H04L 67/02* (2013.01); *H04L 67/28* (2013.01); *H04W 4/70* (2018.02);
(Continued)

(58) Field of Classification Search
CPC .......... H04W 4/08; H04W 4/70; H04W 8/20; H04W 48/14; H04W 84/045; H04L 67/02; H04L 67/28

(Continued)

(56) References Cited

U.S. PATENT DOCUMENTS

2009/0093232 A1* 4/2009 Gupta ................ H04L 63/104
455/410
2009/0286512 A1 11/2009 Huber et al.
(Continued)

FOREIGN PATENT DOCUMENTS

CN 101729993 A 6/2010
CN 102026333 A 4/2011
(Continued)

OTHER PUBLICATIONS

Machine Translation and Abstract of Chinese Publication No. CN101729993, Jun. 9, 2010, 23 pages.
(Continued)

*Primary Examiner* — Anthony S Addy
*Assistant Examiner* — Farid Seyedvosoghi
(74) *Attorney, Agent, or Firm* — Conely Rose, P.C.

(57) ABSTRACT

A small-cell subscriber management method includes receiving, by a terminal, a closed subscriber group (CSG) identity broadcast by a small cell, determining whether the CSG identity is in a CSG identity list stored by the terminal, sending, by the terminal, an access request to the small cell when the CSG identity is in the CSG identity list, requesting, by the terminal after successfully accessing the small cell, a current CSG subscriber list of the small cell from the small cell, managing, by the terminal after receiving the current CSG subscriber list of the small cell, the current CSG subscriber list of the small cell, where a management includes adding a subscriber to, removing a subscriber from, or changing a subscriber in the current CSG subscriber list. According to the foregoing method, a management terminal is used to manage the CSG subscriber list to implement convenient management of a small cell.

12 Claims, 6 Drawing Sheets

(51) Int. Cl.
*H04W 4/70* (2018.01)
*H04L 29/08* (2006.01)
*H04W 8/20* (2009.01)
*H04W 84/04* (2009.01)

(52) U.S. Cl.
CPC .............. *H04W 48/14* (2013.01); *H04W 8/20* (2013.01); *H04W 84/045* (2013.01)

(58) Field of Classification Search
USPC .......................................................... 455/405
See application file for complete search history.

(56) References Cited

U.S. PATENT DOCUMENTS

| | | | |
|---|---|---|---|
| 2010/0075635 A1* | 3/2010 | Lim | H04W 4/08 455/411 |
| 2010/0157850 A1* | 6/2010 | Horn | H04L 63/10 370/259 |
| 2012/0030734 A1 | 2/2012 | Wohlert | |
| 2014/0016529 A1 | 1/2014 | Singh et al. | |
| 2015/0312844 A1 | 10/2015 | Dalsgaard et al. | |

FOREIGN PATENT DOCUMENTS

| | | |
|---|---|---|
| CN | 102165719 A | 8/2011 |
| CN | 102227928 A | 10/2011 |
| CN | 103889023 A | 6/2014 |
| WO | 2011127224 A1 | 10/2011 |
| WO | 2015120048 A1 | 8/2015 |

OTHER PUBLICATIONS

Machine Translation and Abstract of Chinese Publication No. CN102026333, Apr. 20, 2011, 11 pages.
Foreign Communication From a Counterpart Application, PCT Application No. PCT/CN2015/088185, English Translation of International Search Report dated May 16, 2016, 3 pages.
"3rd Generation Partnership Project; Technical Specification Group Radio Access Network; UTRAN architecture for 3G Home Node B (HNB); Stage 2 (Release 12)," XP051294120, 3GPP TS 25.467, V12.3.0, Technical Specification, Dec. 24, 2014, 92 pages.
Foreign Communication From a Counterpart Application, European Application No. 15901998.3, Partial Supplementary European Search Report dated Apr. 23, 2018, 27 pages.
Wang, Y., et al., "Ubiquitous femto awareness application access and service recommendation," XP055495780, IET International Conference on Communication Technology and Application, Jan. 1, 2011, 6 pages.
Horn, G., "3GPP Femtocells: Architecture and Protocols," XP055042410, Sep. 1, 2010, 64 pages.
Foreign Communication From a Counterpart Application, European Application No. 15901998.3, Extended European Search Report dated Aug. 2, 2018, 32 pages.
Foreign Communication From a Counterpart Application, Chinese Application No. 201580044769.6, Chinese Office Action dated Mar. 18, 2019, 2 pages.

\* cited by examiner

SMALL CELL AND SMALL-CELL SUBSCRIBER MANAGEMENT METHOD

CROSS-REFERENCE TO RELATED APPLICATIONS

This application is a continuation of International Patent Application No. PCT/CN2015/088185, filed on Aug. 26, 2015, which is hereby incorporated by reference in its entirety.

TECHNICAL FIELD

The present application relates to methods for communication control and management on a wireless communications network, and in particular, to a small cell and a small-cell subscriber management method.

BACKGROUND

With development and popularization of smartphones, data traffic of mobile communications is steadily on the rise. Particularly, as people increasingly use applications, such as MICROBLOG, WECHAT, FACEBOOK, and TWITTER, it becomes increasingly hard for conventional cellular communications to meet ever-increasing communication traffic required by people. According to statistics, in global mobile communications, approximately 70% data traffic is generated indoors. This shows that most broadband data traffic of people, such as that for video services, online games, MICROBLOG browsing, and WECHAT, is generated in indoor environments. Therefore, it is particularly important to improve indoor signal coverage and indoor user experience for an indoor subscriber. In recent years, small cells have drawn wide attention in the communications industry. A small cell is a small-sized low-power base station, and can provide, based on existing third generation (3G) and fourth generation (4G) wireless standard protocols, wireless communications services to mobile terminals. Small cells are mainly deployed in public places such as shopping malls, offices and coffee shops, or inside homes. The small cell can make up for an indoor coverage shortage of a macro cell, and avoid difficulties in site selection for the macro cell. In addition, compared with the macro cell, the small cell can perform transmission at lower power, and therefore, the small cell is more environmentally friendly.

Figure 1:
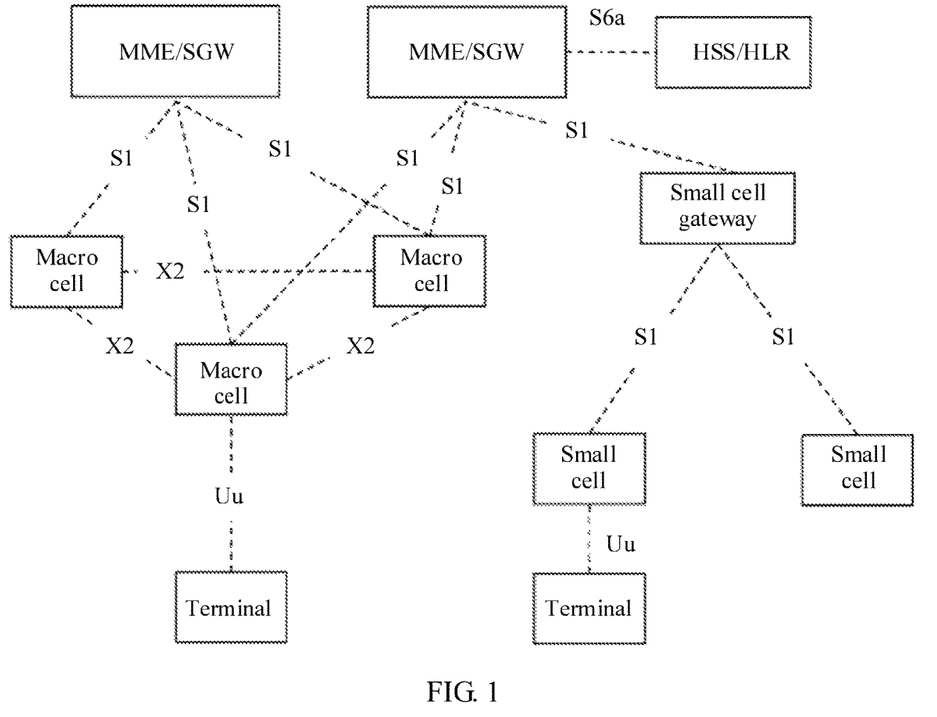
FIG. 1 is a schematic diagram of a wireless network communications system.

In other approaches, a small cell acts as a small-sized base station with low power consumption to provide communications services to mobile subscribers. As shown in FIG. 1, the small cell is connected to a Mobility Management Entity (MME)/Serving Gateway (SGW) using a small cell gateway, to connect to a core network. In addition, the small cell provides wireless communications services to terminals within a coverage area of the small cell using an air interface Uu. An interface S1 exists between a macro cell and the MME/SGW, and an interface X2 exists between macro cells. A macro cell is connected to the core network using the MME/SGW, and provides wireless communications services to terminals within a coverage area of the macro cell using an air interface Uu. Generally, information about a small-cell subscriber is stored in a Home Subscriber Server (HSS) or a Home Location Register (HLR), and the small-cell subscriber is managed using the HSS or the HLR. An interface S6a exists between the HSS or the HLR and the MME/SGW.

Small cells are generally deployed indoors, especially inside homes, but an HSS or an HLR is generally deployed by an operator. A small cell deployed inside a home is generally a private device of the home. Therefore, if an HSS or an HLR of an operator is used to manage a subscriber, great inconvenience is to result.

SUMMARY

Embodiments of the present application provide a small cell and a small-cell subscriber management method to implement convenient management of a small cell using a terminal.

According to a first aspect, a small-cell subscriber management method is provided, where the method includes receiving, by a small cell, an access request sent by an access terminal, where the access request carries an international mobile subscriber identity (IMSI) information of the access terminal, determining, by the small cell, whether an IMSI of the access terminal is in a closed subscriber group (CSG) subscriber list of the small cell, and allowing the access terminal to access the small cell if the access terminal is in the CSG subscriber list, or obtaining, by the small cell, an access number corresponding to the IMSI from a server if the IMSI of the access terminal is not in the CSG subscriber list of the small cell, requesting, by the small cell, a management terminal to determine whether to allow adding the access terminal to the CSG subscriber list if the access number of the access terminal is not in the CSG subscriber list of the small cell, receiving, by the small cell, a determining result of the management terminal, and determining, according to the determining result, whether to allow adding at least one of the IMSI of the access terminal or the access number of the access terminal to the CSG subscriber list of the small cell.

With reference to the first aspect, in a first implementation manner of the first aspect, the server includes an HSS or an HLR, and obtaining, by the small cell, an access number corresponding to the IMSI from a server includes requesting, by the small cell, subscription information of the access terminal from the HSS or the HLR, receiving, by the small cell, the subscription information of the access terminal from the HSS or the HLR, and obtaining, by parsing the subscription information, the access number of the access terminal corresponding to the IMSI.

According to a second aspect, a small-cell subscriber management method is provided, where the method includes receiving, by a management terminal, a determining request of a small cell, where the determining request includes that the small cell requests the management terminal to determine whether to allow adding the access terminal to the CSG subscriber list, and the determining request carries an identity of the access terminal or an access number of the access terminal, and presenting, by the management terminal, to a user of the management terminal, a dialog box asking whether to allow the access terminal to access the small cell or join the CSG subscriber list of the small cell, and sending, to the small cell, a determining result of allowing the access terminal to join the CSG subscriber list if the user performs an operation of choosing to allow the access, sending, to the small cell, a determining result of not allowing the access terminal to join the CSG subscriber list if the user performs an operation of choosing not to allow the access, or performing matching, by the management terminal, between the access number of the access terminal and contacts or call records of the management terminal, and sending, to the small cell, a determining result of allowing the access terminal to join the CSG subscriber list if the access number of the access terminal exists among the contacts or the call records of the management terminal, or sending, to the small cell, a determining result of not allowing the access terminal to join the CSG subscriber list if the access number of the access terminal exists among neither the contacts nor the call records of the management terminal.

With reference to the second aspect, in a first implementation manner of the second aspect, the step of performing matching, by the management terminal, between the access number of the access terminal and contacts or call records of the management terminal, and sending, to the small cell, a determining result of allowing the access terminal to join the CSG subscriber list if the access number of the access terminal exists among the contacts or the call records of the management terminal, or sending, to the small cell, a determining result of not allowing the access terminal to join the CSG subscriber list if the access number of the access terminal exists among neither the contacts nor the call records of the management terminal includes determining, by the management terminal, whether a quantity of call records or call duration of the access terminal exceeds a preset value if the access number of the access terminal exists among the call records of the management terminal, and sending, to the small cell, the determining result of allowing the access terminal to join the CSG subscriber list if the quantity of call records or the call duration of the access terminal exceeds the preset value, or sending, to the small cell, the determining result of not allowing the access terminal to join the CSG subscriber list if the quantity of call records or the call duration of the access terminal does not exceed the preset value.

According to a third aspect, a small-cell subscriber management method is provided, where the method includes initiating, by a terminal, an access request to a small cell, where the terminal is referred to as an access terminal, and the access request carries IMSI information of the access terminal, determining, by the small cell, whether an IMSI of the access terminal is in a CSG subscriber list of the small cell after receiving the access request of the access terminal, and allowing the access terminal to access the small cell if the access terminal is in the CSG subscriber list, or obtaining, by the small cell, an access number corresponding to the IMSI from a server if the IMSI of the access terminal is not in the CSG subscriber list of the small cell, requesting a management terminal to determine whether to allow adding the access terminal to the CSG subscriber list if the access number of the access terminal is not in the CSG subscriber list of the small cell, determining, by the management terminal, whether to add the access terminal to the CSG subscriber list, and sending the determining result to the small cell after receiving, from the small cell, a message asking whether to allow adding the access terminal to the CSG subscriber list of the small cell, and adding, by the small cell, at least one of the IMSI of the access terminal or the access number of the access terminal to the CSG subscriber list of the small cell if the management terminal allows adding the access terminal to the CSG subscriber list of the small cell.

With reference to the third aspect, in a first implementation manner of the third aspect, the server includes an HSS or an HLR, and obtaining, by the small cell, an access number corresponding to the IMSI from a server includes requesting, by the small cell, subscription information of the access terminal from the HSS or the HLR, and receiving, by the small cell, the subscription information of the access terminal from the HSS or the HLR, and obtaining, by parsing the subscription information, the access number of the access terminal corresponding to the IMSI.

According to a fourth aspect, a small-cell subscriber management method is provided, where the method includes broadcasting, by a small cell, a CSG identity of the small cell, where only a terminal belonging to the CSG is allowed to access a base station, receiving, by the small cell, a request of an access terminal, where the request includes that the access terminal requests a current CSG subscriber list of the small cell from the small cell, determining, by the small cell, whether the access terminal has permission to manage the CSG subscriber list of the small cell, and feeding back the current CSG subscriber list of the small cell to the terminal if the access terminal has the permission to manage the CSG subscriber list of the small cell, where the CSG subscriber list fed back by the small cell includes an access number of at least one terminal, and receiving, by the small cell, a modified CSG subscriber list of the small cell sent by the access terminal, where the modification includes that the access terminal adds a subscriber to, removes a subscriber from, or changes a subscriber in the CSG subscriber list of the small cell.

According to a fifth aspect, a small-cell subscriber management method is provided, where the method includes receiving, by a terminal, a CSG identity broadcast by a small cell, determining whether the CSG identity is in a CSG identity list stored by the terminal, and if yes, sending, by the terminal, an access request to the small cell, requesting, by the terminal after successfully accessing the small cell, a current CSG subscriber list of the small cell from the small cell, and managing, by the terminal after receiving the CSG subscriber list of the small cell, the CSG subscriber list of the small cell, where the management includes adding a subscriber to, removing a subscriber from, or changing a subscriber in the subscriber list.

With reference to the fifth aspect, in a first implementation manner of the fifth aspect, managing, by the terminal after receiving the CSG subscriber list of the small cell, the CSG subscriber list of the small cell includes obtaining, by the terminal, agenda arrangement information from an agenda of a management terminal, determining whether there is a visitor, and determining an access number and a visit time of the visitor, and according to the visit time of the visitor, before the visitor pays a visit, instructing the small cell to add the access number of the visitor to the CSG subscriber list of the small cell, and instructing the small cell to remove the access number of the visitor from the CSG subscriber list after the visit time expires.

With reference to the fifth aspect or the first implementation manner of the fifth aspect, in a second implementation manner of the fifth aspect, managing, by the terminal after receiving the CSG subscriber list of the small cell, the CSG subscriber list of the small cell includes requesting the small cell to check whether a terminal user in the CSG subscriber list is within a coverage area of the small cell, and instructing the small cell to remove the terminal user from the CSG subscriber list of the small cell if determining, according a checking result of the small cell, that the terminal user does not perform measurement reporting or access the small cell within a given time period, where the period is greater than a scheduling period in a wireless communications system of the small cell.

With reference to the fifth aspect or the first implementation manner of the fifth aspect or the second implementation manner of the first aspect, in a third implementation manner of the fifth aspect, managing, by the terminal after receiving the CSG subscriber list of the small cell, the CSG subscriber list of the small cell includes presenting the subscriber list on a CSG subscriber list management screen of the terminal, where, if the CSG subscriber list fed back by the small cell includes a subscriber identity and an access number, the subscriber identity and the access number are directly displayed, or matching is performed between the access number fed back by the small cell and access numbers of contacts in the terminal if the CSG subscriber list fed back by the small cell includes only the access number, and if the access number of a contact in the terminal matching the access number fed back by the small cell exists, an identity of the matching contact is displayed as a subscriber identity, or otherwise, a blank value is displayed for a subscriber identity.

With reference to any one of the fifth aspect or the first to the third implementation manners of the fifth aspect, in a fourth implementation manner of the fifth aspect, managing, by the terminal after receiving the CSG subscriber list of the small cell, the CSG subscriber list of the small cell includes selecting, from a contact list of the terminal, both a contact that needs to be added and an access number corresponding to the contact or only the access number that needs to be added, adding, to the CSG subscriber list of the terminal, both the contact and the access number corresponding to the contact that are selected or only the selected access number, sending, to the small cell, information about both the contact and the access number that are added or only the access number that needs to be added, and instructing the small cell to add both the contact and the access number or add only the access number to the CSG subscriber list of the small cell.

According to a sixth aspect, a small cell is provided, where the small cell includes a receiving module configured to receive an access request sent by an access terminal, where the access request carries IMSI information of the access terminal, a sending module configured to send information to a terminal or another base station, a storage module configured to store a CSG subscriber list, and a processing module configured to determine whether an IMSI of the access terminal is in the CSG subscriber list stored by the storage module, and allow the access terminal to access the small cell if the access terminal is in the CSG subscriber list, or obtain, using the sending module and the receiving module, an access number corresponding to the IMSI from a server if the IMSI of the access terminal is not in the CSG subscriber list of the small cell, and send, using the sending module, a request to the management terminal to request the management terminal to determine whether to allow adding the access terminal to the CSG subscriber list if the access number of the access number is not in the CSG subscriber list of the small cell, where the processing module determines, according to a determining result of the management terminal received by the receiving module, whether to allow adding at least one of the IMSI of the access terminal or the access number of the access terminal to the CSG subscriber list of the small cell.

According to a seventh aspect, a terminal is provided, where the terminal includes a receiving module configured to receive a determining request of a small cell, where the determining request includes that the small cell requests a management terminal to determine whether to allow adding the access terminal to the CSG subscriber list, and the determining request carries an identity of the access terminal or an access number of the access terminal, a storage module configured to store the CSG subscriber list, contacts, and call records, a presence module configured to present, to a user of the terminal, a dialog box asking whether to allow the access terminal to access the small cell or join the CSG subscriber list of the small cell, a sending module configured to send, to the small cell, a determining result of allowing the access terminal to join the CSG subscriber list when the user performs an operation of choosing to allow the access, or send, to the small cell, a determining result of not allowing the access terminal to join the CSG subscriber list when the user performs an operation of choosing not to allow the access, and a processing module configured to perform matching between the access number of the access terminal and the contacts or the call records that are stored by the storage module, and send, to the small cell using the sending module, a determining result of allowing the access terminal to join the CSG subscriber list if the access number of the access terminal exists among the contacts or the call records of the management terminal, or send, to the small cell using the sending module, a determining result of not allowing the access terminal to join the CSG subscriber list if the access number of the access terminal exists among neither the contacts nor the call records.

According to an eighth aspect, a wireless communications system is provided, including a small cell, an access terminal, and a management terminal, where the access terminal initiates an access request to the small cell, where the access request carries IMSI information of the access terminal, the small cell determines whether an IMSI of the access terminal is in a CSG subscriber list of the small cell after receiving the access request of the access terminal, and allows the access terminal to access the small cell if the access terminal is in the CSG subscriber list, or the small cell obtains an access number corresponding to the IMSI from a server if the IMSI of the access terminal is not in the CSG subscriber list of the small cell, the small cell requests the management terminal to determine whether to allow adding the access terminal to the CSG subscriber list if the access number of the access terminal is not in the CSG subscriber list of the small cell, the management terminal determines whether to add the access terminal to the CSG subscriber list, and sends the determining result to the small cell after receiving, from the small cell, a message asking whether to allow adding the access terminal to the CSG subscriber list of the small cell, and the small cell adds at least one of the IMSI of the access terminal or the access number of the access terminal to the CSG subscriber list of the small cell if the management terminal allows adding the access terminal to the CSG subscriber list of the small cell.

According to a ninth aspect, a small cell is provided, where the small cell includes a sending module configured to broadcast a CSG identity of the small cell, where only a terminal belonging to a CSG is allowed to access a base station, a receiving module configured to receive a request of an access terminal, where the request includes that the access terminal requests a current CSG subscriber list of the small cell from the small cell, a storage module configured to store the CSG identity and the current CSG subscriber list, and a processing module configured to determine whether the access terminal has permission to manage the CSG subscriber list of the small cell, and if yes, feedback the current CSG subscriber list of the small cell to the terminal, where the CSG subscriber list fed back by the small cell includes an access number of at least one terminal, where the receiving module is further configured to receive a modified CSG subscriber list of the small cell sent by the access terminal, where the modification includes that the access terminal adds a subscriber to, removes a subscriber from, or changes a subscriber in the CSG subscriber list of the small cell.

According to a tenth aspect, a terminal is provided, where the terminal includes a receiving module configured to receive a CSG identity broadcast by a small cell, a sending module configured to send information to the small cell, a storage module configured to store a CSG identity list, and a processing module configured to determine whether the CSG identity is in the CSG identity list stored by the storage module, and if yes, send an access request to the small cell using the sending module, where the processing module requests, using the sending module, a current CSG subscriber list of the small cell from the small cell after the terminal successfully accesses the small cell, and the processing module manages the CSG subscriber list of the small cell after the receiving module receives the CSG subscriber list of the small cell, where a management includes adding a subscriber to, removing a subscriber from, or changing a subscriber in the subscriber list.

According to the embodiments of the present application, a management terminal is used to manage a CSG subscriber list to implement convenient management of a small cell. The management terminal has a capability to manage the CSG subscriber list of the small cell, that is, capable of adding a subscriber to, removing a subscriber from, or updating a subscriber in the CSG subscriber list of the small cell, thereby implementing convenient management, updating and maintenance of subscribers of the small cell.

DESCRIPTION OF EMBODIMENTS

The following further describes the technical solutions of the present application with reference to the accompanying drawings and embodiments.

Figure 2:
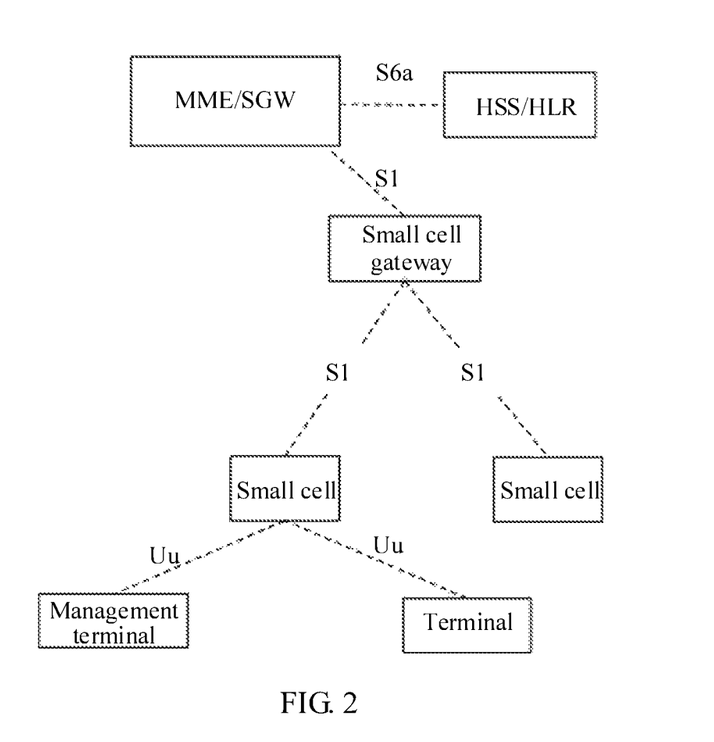
FIG. 2 is a schematic diagram of a wireless network communications system according to the present application.

As shown in FIG. 2, the embodiments of the present application provide a small-cell subscriber management method. A small cell (e.g., Femto, Femtocell, or Home evolved Node B (eNodeB)) is a small-sized low-power base station, and may be based on existing 3G and 4G wireless standard protocols or even future fifth generation (5G) wireless standard protocols. The small cell stores a CSG subscriber list of the small cell, and only a subscriber in the CSG subscriber list is allowed to access the small cell using an air interface Uu between a terminal and the small cell. Therefore, managing a small cell is mainly implemented by managing a CSG subscriber list.

According to the embodiments of the present application, a management terminal is used to manage a CSG subscriber list to implement convenient management of a small cell. The management terminal has a capability to manage the CSG subscriber list of the small cell, that is, capable of adding a subscriber to, removing a subscriber from, or updating a subscriber in the CSG subscriber list of the small cell, thereby implementing convenient management, updating and maintenance of subscribers of the small cell. The small cell is connected to a small cell gateway using an interface S1. The small cell gateway is responsible for aggregating and forwarding signaling and data between the small cell and a core network. The small cell gateway is connected to an MME/SGW using an interface S1. The MME/SGW is responsible for subscriber mobility management, and routing and forwarding of data packets of subscribers. The MME communicates with an HSS or an HLR using an interface S6a. The HSS or the HLR stores subscription data and related information of subscribers.

Embodiment 1

Figure 3:
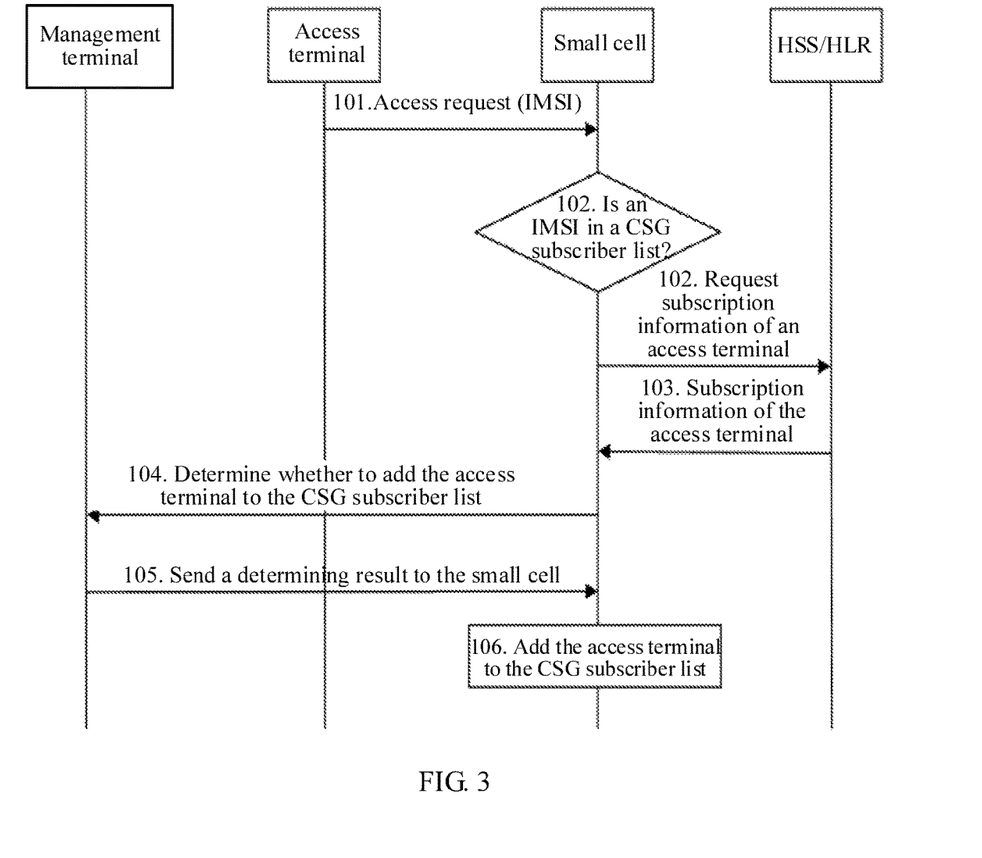
FIG. 3 is a schematic flowchart of a small-cell subscriber management method according to Embodiment 1 of the present application.

As show in FIG. 3, Embodiment 1 of the present application provides a small cell and a small-cell subscriber management method, where the method includes the following steps.

Step 101: When a terminal enters a coverage area of a small cell, the terminal initiates an access request to the small cell, where the terminal is referred to as an access terminal, and the access request carries IMSI information of the access terminal.

Step 102: After receiving the access request of the access terminal, the small cell determines whether an IMSI of the access terminal is in a CSG subscriber list of the small cell, and allows the access terminal to access the small cell if the access terminal is in the CSG subscriber list, or the small cell requests subscription information of the access terminal from an HSS or an HLR if the IMSI of the access terminal is not in the CSG subscriber list of the small cell.

Step 103: The small cell receives the subscription information of the access terminal from the HSS or the HLR, and obtains, by parsing the subscription information, an access number of the access terminal corresponding to the IMSI.

Step 104: If the access number of the access terminal is not in the CSG subscriber list of the small cell, the small cell requests a management terminal to determine whether to allow adding the access terminal to the CSG subscriber list.

Step 105: After receiving, from the small cell, a message asking whether to allow adding the access terminal to the CSG subscriber list of the small cell, the management terminal determines whether to add the access terminal to the CSG subscriber list, and sends the determining result to the small cell.

Step 106: If the management terminal allows adding the access terminal to the CSG subscriber list of the small cell, the small cell adds at least one of the IMSI of the access terminal or the access number of the access terminal to the CSG subscriber list of the small cell.

On one hand, in the foregoing small-cell subscriber management method, the small cell receives the access request sent by the access terminal, where the access request carries the IMSI information of the access terminal. The small cell determines whether the IMSI of the access terminal is in the CSG subscriber list of the small cell, and the small cell allows the access terminal to access the small cell if the access terminal is in the CSG subscriber list, or the small cell obtains the access number corresponding to the IMSI from the server from the small cell if the IMSI of the access terminal is not in the CSG subscriber list of the small cell. The small cell requests the management terminal to determine whether to allow adding the access terminal to the CSG subscriber list if the access number of the access terminal is not in the CSG subscriber list of the small cell, and the small cell receives the determining result of the management terminal, and determines, according to the determining result, whether to allow adding at least one of the IMSI of the access terminal or the access number of the access terminal to the CSG subscriber list of the small cell.

The server includes the HSS or the HLR. That the small cell obtains a access number corresponding to the IMSI from a server includes that the small cell requests the subscription information of the access terminal from the HSS or the HLR, and the small cell receives the subscription information of the access terminal from the HSS or the HLR, and obtains, by parsing the subscription information, the access number of the access terminal corresponding to the IMSI.

On the other hand, in the foregoing small-cell subscriber management method, the management terminal receives the determining request of the small cell, where the determining request includes that the small cell requests the management terminal to determine whether to allow adding the access terminal to the CSG subscriber list, and the determining request carries an identity of the access terminal or the access number of the access terminal, and the management terminal presents, to a user of the management terminal, a dialog box asking whether to allow the access terminal to access the small cell or join the CSG subscriber list of the small cell, and sends, to the small cell, a determining result of allowing the access terminal to join the CSG subscriber list if the user performs an operation of choosing to allow the access, sends, to the small cell, a determining result of not allowing the access terminal to join the CSG subscriber list if the user performs an operation of choosing not to allow the access, or the management terminal performs matching between the access number of the access terminal and contacts or call records of the management terminal, and sends, to the small cell, a determining result of allowing the access terminal to join the CSG subscriber list if the access number of the access terminal exists among the contacts or the call records of the management terminal, or sends, to the small cell, a determining result of not allowing the access terminal to join the CSG subscriber list if the access number of the access terminal exists among neither the contacts nor the call records of the management terminal.

In addition, if the access number of the access terminal exists among the call records of the management terminal, the management terminal determines whether a quantity of call records or call duration of the access terminal exceeds a preset value, and sends, to the small cell, the determining result of allowing the access terminal to join the CSG subscriber list if the quantity of call records or the call duration of the access terminal exceeds the preset value, or sends, to the small cell, the determining result of not allowing the access terminal to join the CSG subscriber list if the quantity of call records or the call duration of the access terminal does not exceed the preset value.

Embodiment 2

Embodiment 2 of the present application provides a small-cell subscriber management method, which is a method for active management of subscribers of a small cell. A terminal obtains a latest CSG list from a small cell, performs matching between the subscriber group list and contacts, displays an identity and an access number in the CSG subscriber list, and on this basis, adds, removes, or changes a subscriber. In this way, an individual subscriber can manage subscriber's own small cell, and effectively control the access number that can use the small cell of the subscriber. This is equivalent so that the individual subscriber establishes subscriber's own mobile signal coverage but allows access of only a terminal that is related to or approved by the subscriber.

Figure 4:
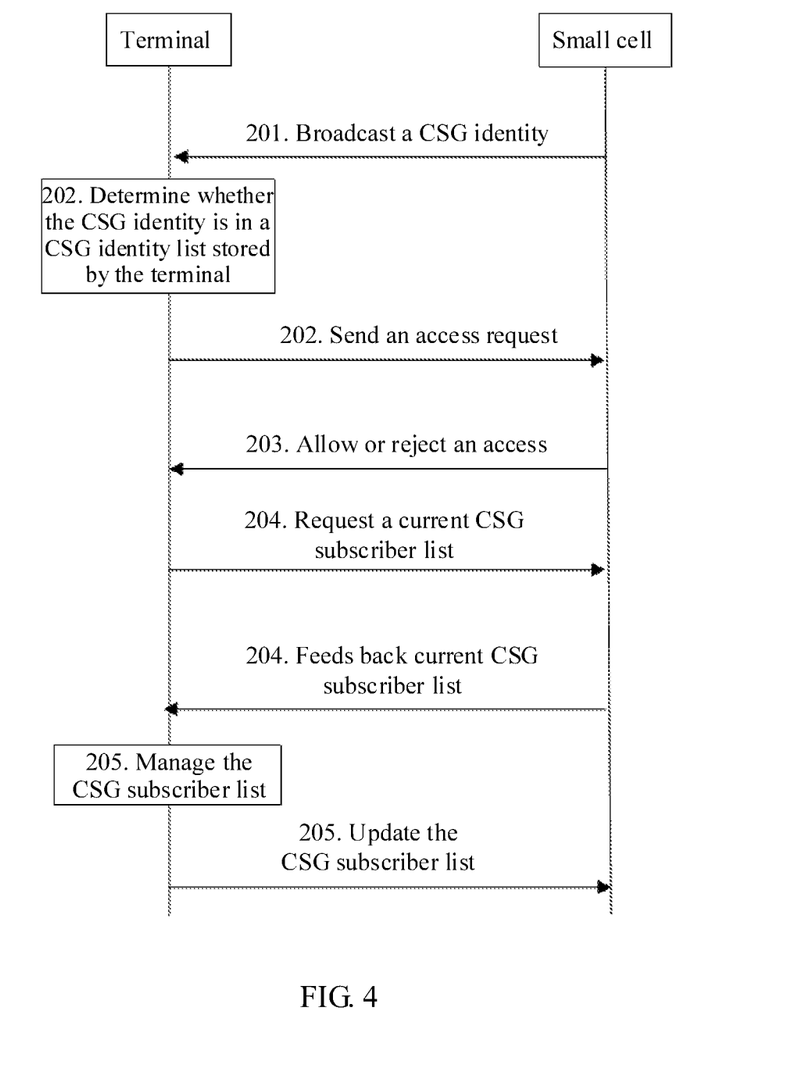
FIG. 4 is a schematic flowchart of a small-cell subscriber management method according to Embodiment 2 of the present application.

As shown in FIG. 4, the small-cell subscriber management method includes the following steps.

Step 201: A small cell broadcasts a CSG identity of the small cell, where only a terminal belonging to the CSG is allowed to access the small cell.

Step 202: The terminal receives the CSG identity broadcast by the small cell, determines whether the CSG identity is in a CSG identity list stored by the terminal, and if yes, sends an access request to the small cell.

Step 203: After receiving the access request of the terminal, the small cell determines whether the terminal is a subscriber in a CSG identity subscriber list of the small cell, and if yes, allows access of the terminal, or otherwise, rejects access of the terminal.

Step 204: The terminal requests a current CSG subscriber list of the small cell from the small cell after successfully accessing the small cell. The small cell determines whether the terminal has permission to manage the CSG identity subscriber list of the small cell, and if yes, the small cell feeds back the current CSG subscriber list of the small cell to the terminal, where the CSG subscriber list fed back by the small cell includes an access number of at least one terminal.

Step 205: The terminal may manage the CSG subscriber list of the small cell after receiving the CSG subscriber list of the small cell, where the management includes adding a subscriber to, removing a subscriber from, or changing a subscriber in the subscriber list.

In the foregoing small-cell subscriber management method, the small cell broadcasts the CSG identity of the small cell, where only a terminal belonging to the CSG is allowed to access the base station, the small cell receives the request of the access terminal, where the request is that the access terminal requests the current CSG subscriber list of the small cell from the small cell, the small cell determines whether the access terminal has the permission to manage the CSG subscriber list of the small cell, and if yes, the small cell feeds back the CSG subscriber list of the small cell to the terminal, where the CSG subscriber list fed back by the small cell includes the access number of at least one terminal, and the small cell receives the modified CSG subscriber list of the small cell sent by the access terminal, where the modification includes that the access terminal adds a subscriber to, removes a subscriber from, or changes a subscriber in the CSG subscriber list of the small cell.

That the small cell determines whether the access terminal has permission to manage the CSG subscriber list of the small cell is performed according to a list of subscribers having management permission, where the list is preset in the small cell. A subscriber in the list has the management permission, and a subscriber not in the list is determined not to have the management permission.

The foregoing small-cell subscriber management method further includes checking, by the small cell, according to a predetermined period, whether a terminal user in a CSG subscriber list of the small cell is within a coverage area of the small cell, where the predetermined period is greater than a scheduling period in a wireless communications system of the small cell, and removing the terminal user from the CSG subscriber list of the small cell, if determining, according to a checking result of the small cell, that the terminal user in the CSG subscriber list of the small cell is not within the coverage area of the small cell within the predetermined period.

Removing the terminal user from the CSG subscriber list of the small cell, if determining, according to a checking result of the small cell, that the terminal user in the CSG subscriber list of the small cell is not within the coverage area of the small cell within the predetermined period includes removing the terminal user from the CSG subscriber list of the small cell if determining, according to the checking result of the small cell, that the terminal user does not perform measurement reporting or access the small cell within a given time period.

In the foregoing small-cell subscriber management method, the terminal receives the CSG identity broadcast by the small cell, determines whether the CSG identity is in the CSG identity list stored by the terminal, and if yes, the terminal sends the access request to the small cell. The terminal requests the current CSG subscriber list of the small cell from the small cell after successfully accessing the small cell. The small cell determines whether the terminal has the permission to manage the CSG subscriber list of the small cell, and if yes, the small cell feeds back the CSG subscriber list of the small cell to the terminal, where the CSG subscriber list fed back by the small cell includes the access number of at least one terminal, and the terminal may manage the CSG subscriber list of the small cell after receiving the CSG subscriber list of the small cell, where the management includes adding a subscriber to, removing a subscriber from, or changing a subscriber in the subscriber list.

Figure 5:
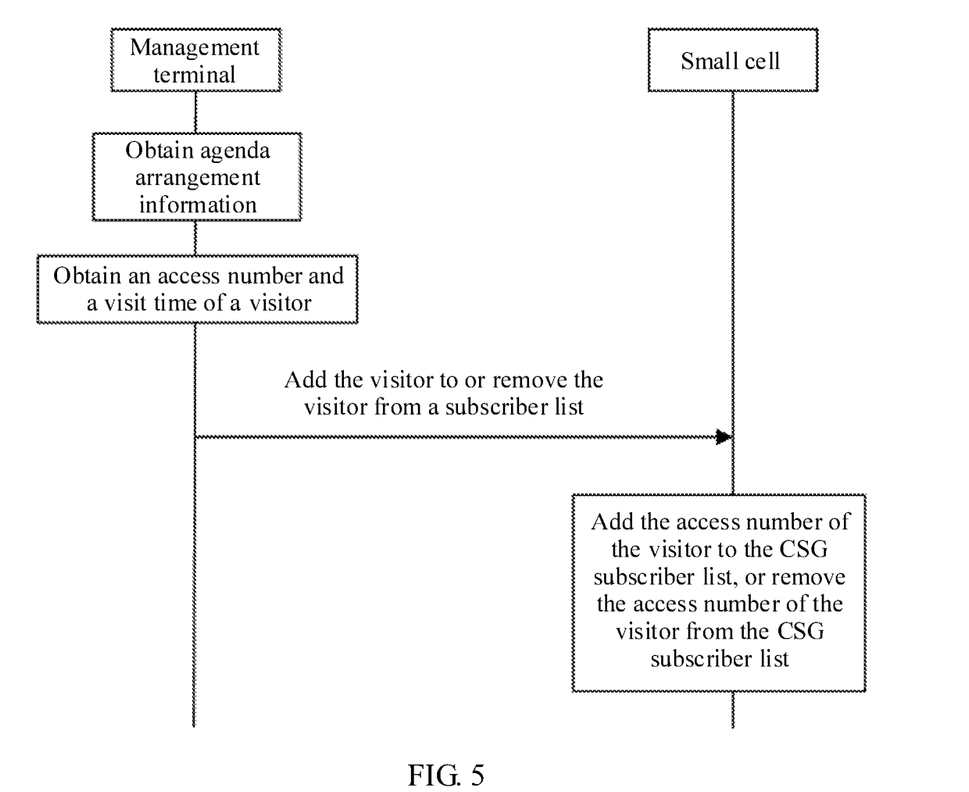
FIG. 5 is another schematic flowchart of the small-cell subscriber management method according to Embodiment 2 of the present application.

As shown in FIG. 5, that the terminal manages the CSG subscriber list of the small cell after receiving the CSG subscriber list of the small cell includes obtaining, by the terminal, agenda arrangement information from an agenda of a management terminal, determining whether there is a visitor, and determining an access number and a visit time of a visitor, and according to the visit time of the visitor, before the visitor pays a visit, instructing the small cell to add the access number of the visitor to the CSG subscriber list of the small cell, and instructing the small cell to remove the access number of the visitor from the CSG subscriber list after the visit time expires.

In addition, that the terminal manages the CSG subscriber list of the small cell after receiving the CSG subscriber list of the small cell includes requesting, by the terminal, the small cell to check whether a terminal user in the CSG subscriber list is within a coverage area of the small cell, and if determining, according to a checking result of the small cell, that the terminal user does not perform measurement reporting or access the small cell within a given time period, instructing the small cell to remove the terminal user from the CSG subscriber list of the small cell, where the period is greater than a scheduling period in a wireless communications system of the small cell.

When receiving the CSG subscriber list fed back by the small cell, the terminal presents the subscriber list on a CSG subscriber list management screen of the terminal. If the CSG subscriber list fed back by the small cell includes a subscriber identity (designated as ID1, ID2, ID3, and so on) and an access number (designated as Access number 1, Access number 2, Access number 3, and so on), as listed in Table 1, the subscriber identity and the access number are directly displayed. If the CSG subscriber list fed back by the small cell includes only an access number, matching is performed between the access number fed back by the small cell and access numbers of contacts in the terminal. If an access number of a contact in the terminal matching the access number fed back by the small cell exists, an identity of the matching contact is displayed as a subscriber identity, or otherwise, a blank value is displayed for a subscriber identity.

TABLE 1

| ID1 | Access number 1 |
| ID2 | Access number 2 |
| ID3 | Access number 3 |
| ID4 | Access number 4 |
| ID5 | Access number 5 |
| ... | ... |

When the terminal adds a subscriber to the CSG subscriber list, the terminal may select, from a contact list of the terminal, a contact that needs to be added and an access number of the contact, add the selected contact and the access number of the contact to the CSG subscriber list of the terminal, send information about the added contact and the access number to the small cell, and instruct the small cell to add the contact and the access number to the CSG subscriber list of the small cell. After receiving the added contact and the access number, the small cell stores the added contact and the access number to the CSG subscriber list of the small cell. Further, if the small cell does not store an IMSI number corresponding to the access number, the small cell requests the IMSI number corresponding to the mobile phone from an HSS or an HLR. The small cell stores the received IMSI number and the corresponding access number in the CSG subscriber list.

When the terminal removes a subscriber from the CSG subscriber list, the terminal selects a corresponding subscriber in the CSG subscriber list, removes an access number and a subscriber identity of the selected subscriber, sends, to the small cell, the access number of the selected subscriber in the CSG identity subscriber list, and instructs the small cell to remove information about the corresponding subscriber from the CSG subscriber list of the small cell. After the small cell receives the instruction, the small cell removes the information about the corresponding subscriber from the CSG subscriber list of the small cell.

Embodiment 3

Figure 6:
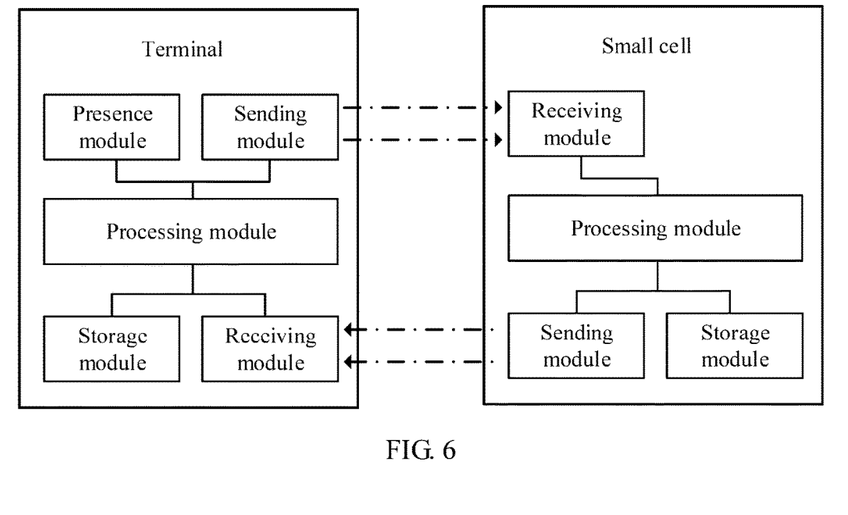
FIG. 6 is a schematic structural diagram of a small cell and a terminal according to Embodiments 3 and 4.

As shown in FIG. 6, a wireless communications system according to Embodiment 3 includes a small cell, and a terminal that may act as an access terminal, and a management terminal.

The access terminal initiates an access request to the small cell, where the access request carries IMSI information of the access terminal.

After receiving the access request of the access terminal, the small cell determines whether an IMSI of the access terminal is in a CSG subscriber list of the small cell, and allows the access terminal to access the small cell if the access terminal is in the CSG subscriber list.

If the IMSI of the access terminal is not in the CSG subscriber list of the small cell, the small cell obtains an access number corresponding to the IMSI from a server.

If the access number of the access terminal is not in the CSG subscriber list of the small cell, the small cell requests the management terminal to determine whether to allow adding the access terminal to the CSG subscriber list.

After receiving, from the small cell, a message asking whether to allow adding the access terminal to the CSG subscriber list of the small cell, the management terminal determines whether to add the access terminal to the CSG subscriber list, and sends the determining result to the small cell.

If the management terminal allows adding the access terminal to the CSG subscriber list of the small cell, the small cell adds at least one of the IMSI of the access terminal or the access number of the access terminal to the CSG subscriber list of the small cell.

The small cell includes a receiving module configured to receive the access request sent by the access terminal, where the access request carries the IMSI information of the access terminal, a sending module configured to send information to the management terminal or another base station, a storage module configured to store the CSG subscriber list, and a processing module configured to determine whether the IMSI of the access terminal is in the CSG subscriber list stored by the storage module, and allow the access terminal to access the small cell if the access terminal is in the CSG subscriber list, or obtain, using the sending module and the receiving module, the access number corresponding to the IMSI from the server if the IMSI of the access terminal is not in the CSG subscriber list of the small cell, and send, using the sending module, a request to the management terminal to request the management terminal to determine whether to allow adding the access terminal to the CSG subscriber list if the access number of the access number is not in the CSG subscriber list of the small cell, where the processing module determines, according to the determining result of the management terminal received by the receiving module, whether to allow adding at least one of the IMSI of the access terminal or the access number of the access terminal to the CSG subscriber list of the small cell.

The server includes an HSS or an HLR, and that the processing module obtains, using the sending module and the receiving module, the access number corresponding to the IMSI from the server includes that the sending module requests subscription information of the access terminal from the HSS or the HLR, the receiving module receives the subscription information of the access terminal from the HSS or the HLR, and the processing module obtains, by parsing the subscription information, the access number of the access terminal corresponding to the IMSI.

The management terminal includes a receiving module configured to receive the determining request of the small cell, where the determining request includes that the small cell requests the management terminal to determine whether to allow adding the access terminal to the CSG subscriber list, and the determining request carries an identity of the access terminal or the access number of the access terminal, a storage module configured to store the CSG subscriber list, contacts, and call records, a presence module configured to present, to a user of the terminal, a dialog box asking whether to allow the access terminal to access the small cell or join the CSG subscriber list of the small cell, a sending module configured to send, to the small cell, a determining result of allowing the access terminal to join the CSG subscriber list when the user performs an operation of choosing to allow the access, or send, to the small cell, a determining result of not allowing the access terminal to join the CSG subscriber list when the user performs an operation of choosing not to allow the access, and a processing module configured to perform matching between the access number of the access terminal and the contacts or the call records that are stored by the storage module, and send, to the small cell using the sending module, a determining result of allowing the access terminal to join the CSG subscriber list if the access number of the access terminal exists among the contacts or the call records of the management terminal, or send, to the small cell using the sending module, a determining result of not allowing the access terminal to join the CSG subscriber list if the access number of the access terminal exists among neither the contacts nor the call records, where the processing module is configured to determine whether a quantity of call records or call duration of the access terminal exceeds a preset value when the access number of the access terminal exists among the call records of the management terminal, and send, to the small cell using the sending module, the determining result of allowing the access terminal to join the CSG subscriber list if the quantity of call records or the call duration of the access terminal exceeds the preset value or send, to the small cell using the sending module, the determining result of not allowing the access terminal to join the CSG subscriber list if the quantity of call records or the call duration of the access terminal does not exceed the preset value.

Embodiment 4

As shown in FIG. 6, Embodiment 4 of the present application provides a small cell. The small cell includes a sending module configured to broadcast a CSG identity of the small cell, where only a terminal belonging to the CSG is allowed to access a base station, a receiving module configured to receive a request of an access terminal, where the request includes that the access terminal requests a current CSG subscriber list of the small cell from the small cell, a storage module configured to store the CSG identity and the current CSG subscriber list, and a processing module configured to determine whether the access terminal has permission to manage the CSG subscriber list of the small cell, and if yes, feedback the current CSG subscriber list of the small cell to the terminal, where the CSG subscriber list fed back by the small cell includes an access number of at least one terminal, where the receiving module is further configured to receive a modified CSG subscriber list of the small cell sent by the access terminal, where the modification includes that the access terminal adds a subscriber to, removes a subscriber from, or changes a subscriber in the CSG subscriber list of the small cell.

As shown in FIG. 6, Embodiment 4 of the present application further provides a terminal, where the terminal includes a receiving module configured to receive a CSG identity broadcast by a small cell, a sending module configured to send information to the small cell, a storage module configured to store a CSG identity list, and a processing module configured to determine whether the CSG identity is in the CSG identity list stored by the storage module, and if yes, send an access request to the small cell using the sending module, where the processing module requests, from the small cell using the sending module, a current CSG subscriber list of the small cell after the terminal successfully accesses the small cell, and the processing module manages the CSG subscriber list of the small cell after the receiving module receives the CSG subscriber list of the small cell, where the management includes adding a subscriber to, removing a subscriber from, or changing a subscriber in the subscriber list.

The processing module is further configured to obtain agenda arrangement information from an agenda stored by the storage module, determine whether there is a visitor, and determine an access number and a visit time of a visitor, and according to the visit time of the visitor, before the visitor pays a visit, instruct, using the sending module, the small cell to add the access number of the visitor to the CSG subscriber list of the small cell, and after the visit time expires, instruct, using the sending module, the small cell to remove the access number of the visitor from the CSG subscriber list.

The sending module sends, to the small cell, a request to request the small cell to check whether a terminal user in the CSG subscriber list is within a coverage area of the small cell, and if determining, according a checking result of the small cell, that the terminal user does not perform measurement reporting or access the small cell within a given time period, the processing module instructs the small cell to remove the terminal user from the CSG subscriber list of the small cell, where the period is greater than a scheduling period in a wireless communications system of the small cell.

The terminal further includes a presence module configured to present the subscriber list on a CSG subscriber list management screen of the terminal, where, if the CSG subscriber list fed back by the small cell includes a subscriber identity and an access number, the subscriber identity and the access number are directly displayed, or if the CSG subscriber list fed back by the small cell includes only the access number, matching is performed between the access number fed back by the small cell access numbers of contacts in the terminal, and if an access number of a contact in the terminal matching the access number fed back by the small cell exists, an identity of the matching contact is displayed as a subscriber identity, or otherwise, a blank value is displayed for a subscriber identity.

The processing module is configured to select, from a contact list stored by the storage module, both a contact that needs to be added and—an access number corresponding to the contact or only an access number that needs to be added, add, to the CSG subscriber list of the terminal, both the contact and the access number corresponding to the contact that are selected or only the selected access number, send, to the small cell, information about both the contact and the access number that are added or only the access number that needs to be added, and instruct the small cell to add both the contact and the access number or add only the access number to the CSG subscriber list of the small cell.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the principle of the present application should fall within the protection scope of the present application.

What is claimed is:

1. A small-cell subscriber management method, comprising:
   receiving, by a small cell, an access request from an access terminal, wherein the access request carries international mobile subscriber identity (IMSI) information of the access terminal;
   determining, by the small cell, whether an IMSI of the access terminal is in a closed subscriber group (CSG) subscriber list of the small cell;
   allowing, by the small cell, the access terminal to access the small cell when the IMSI of the access terminal is in the CSG subscriber list;
   obtaining, by the small cell, an access number corresponding to the IMSI from a server when the IMSI of the access terminal is not in the CSG subscriber list of the small cell;
   requesting, by the small cell, a management terminal to determine whether to allow adding the access terminal to the CSG subscriber list when the access number of the access terminal is not in the CSG subscriber list of the small cell, wherein the management terminal makes the determination either based on a user instruction or based on performing matching between the access number of the access terminal and contacts or call records of the management terminal;
   receiving, by the small cell, a determining result of the management terminal; and
   determining, according to the determining result, whether to allow adding the IMSI of the access terminal or the access number of the access terminal to the CSG subscriber list of the small cell.

2. The small-cell subscriber management method of claim 1, wherein the server comprises a home subscriber server (HSS) or a home location register (HLR), and wherein obtaining the access number comprises:
   requesting, by the small cell, subscription information of the access terminal from the HSS or the HLR;
   receiving, by the small cell, the subscription information of the access terminal from the HSS or the HLR; and
   obtaining, by the small cell parsing the subscription information, the access number of the access terminal corresponding to the IMSI.

3. The small-cell subscriber management method of claim 1, wherein the small cell stores the CSG subscriber list locally within a memory of the small cell.

4. The small-cell subscriber management method of claim 1, wherein the small cell is communicatively coupled to the access terminal and the management terminal through an air interface.

5. The small-cell subscriber management method of claim 1, wherein the small cell comprises a femtocell.

6. The small-cell subscriber management method of claim 1, wherein the small cell comprises a Home evolved Node B.

7. The small-cell subscriber management method of claim 1, wherein the small cell manages additions to and deletions from the CSG subscriber list from instructions received from the management terminal over an air interface.

8. A small-cell subscriber management method, comprising:
   initiating, by an access terminal, an access request to a small cell, wherein the access request carries international mobile subscriber identity (IMSI) information of the access terminal;
   determining, by the small cell, whether an IMSI of the access terminal is in a closed subscriber group (CSG) subscriber list of the small cell after receiving the access request of the access terminal;
   allowing, by the small cell, the access terminal to access the small cell when the IMSI of the access terminal is in the CSG subscriber list;
   either obtaining, by the small cell, an access number corresponding to the IMSI from a server or requesting a management terminal to determine whether to allow adding the access terminal to the CSG subscriber list when the IMSI of the access terminal is not in the CSG subscriber list of the small cell;

determining, by the management terminal, whether to add the access terminal to the CSG subscriber list and sending a determining result to the small cell after receiving, from the small cell, a message requesting whether to allow adding the access terminal to the CSG subscriber list of the small cell, wherein the management terminal makes the determination either based on a user instruction or based on performing matching between the access number of the access terminal and contacts or call records of the management terminal; and adding, by the small cell, at least one of the IMSI of the access terminal or the access number of the access terminal to the CSG subscriber list of the small cell when the management terminal allows adding the access terminal to the CSG subscriber list of the small cell.

9. The small-cell subscriber management method of claim 8, wherein the server comprises a home subscriber server (HSS) or a home location register (HLR), and wherein obtaining the access number corresponding to the IMSI from the server comprises:

requesting, by the small cell, subscription information of the access terminal from the HSS or the HLR;

receiving, by the small cell, the subscription information of the access terminal from the HSS or the HLR; and obtaining, by the small cell by parsing the subscription information, the access number of the access terminal corresponding to the IMSI.

10. A small cell, comprising:

a receiver configured to receive an access request from an access terminal, wherein the access request carries international mobile subscriber identity (IMSI) information of the access terminal;

a transmitter configured to send the IMSI information to a management terminal or another base station;

a memory configured to store a closed subscriber group (CSG) subscriber list; and a processor coupled to the receiver, the transmitter, and the memory and configured to:

determine whether an IMSI of the access terminal is in the CSG subscriber list stored by the memory;

allow the access terminal to access the small cell when the access terminal is in the CSG subscriber list;

obtain, using the transmitter and the receiver, an access number corresponding to the IMSI from a server when the IMSI of the access terminal is not in the CSG subscriber list of the small cell;

send, to the management terminal using the transmitter, a request for the management terminal to determine whether to allow adding the access terminal to the CSG subscriber list when the access number of the access terminal is not in the CSG subscriber list of the small cell, wherein the management terminal makes the determination either based on a user instruction or based on performing matching between the access number of the access terminal and contacts or call records of the management terminal; and determine, according to a determining result of the management terminal received by the receiver, whether to allow adding the IMSI of the access terminal or the access number of the access terminal to the CSG subscriber list of the small cell.

11. The small cell of claim 10, wherein the server comprises a home subscriber server (HSS) or a home location register (HLR), wherein when obtaining the access number corresponding to the IMSI from the server, the transmitter is configured to request subscription information of the access terminal from the HSS or the HLR, wherein the receiver is further configured to receive the subscription information of the access terminal from the HSS or the HLR, and wherein the processor is further configured to obtain, by parsing the subscription information, the access number of the access terminal corresponding to the IMSI.

12. A wireless communications system, comprising:

an access terminal configured to initiate an access request, wherein the access request carries international mobile subscriber identity (IMSI) information of the access terminal;

a small cell coupled to the access terminal and configured to:

determine whether an IMSI of the access terminal is in a closed subscriber group (CSG) subscriber list of the small cell after receiving the access request of the access terminal;

allow the access terminal to access the small cell when the access terminal is in the CSG subscriber list;

obtain an access number corresponding to the IMSI from a server when the IMSI of the access terminal is not in the CSG subscriber list of the small cell; and request the management terminal to determine whether to allow adding the access terminal to the CSG subscriber list when the access number of the access terminal is not in the CSG subscriber list of the small cell; and a management terminal coupled to the small cell and configured to:

determine whether to add the access terminal to the CSG subscriber list after receiving, from the small cell, a message requesting whether to allow adding the access terminal to the CSG subscriber list of the small cell, wherein the management terminal makes the determination either based on a user instruction or based on performing matching between the access number of the access terminal and contacts or call records of the management terminal; and send a determining result to the small cell, and wherein the small cell is further configured to add the IMSI of the access terminal or the access number of the access terminal to the CSG subscriber list of the small cell when the management terminal allows adding the access terminal to the CSG subscriber list of the small cell.

* * * * *